United States Patent
Poma

(10) Patent No.: US 7,024,809 B1
(45) Date of Patent: Apr. 11, 2006

(54) COMPOSITE PANEL DISPLAY BY REFRACTED LIGHT

(76) Inventor: James Poma, 365 McClurg Rd., Boardman, OH (US) 44512

( * ) Notice: Subject to any disclaimer, the term of this patent is extended or adjusted under 35 U.S.C. 154(b) by 276 days.

(21) Appl. No.: 10/335,806

(22) Filed: Jan. 2, 2003

(51) Int. Cl.
*G09F 3/18* (2006.01)
*G09F 3/00* (2006.01)

(52) U.S. Cl. .......................... 40/546; 264/400; 40/442
(58) Field of Classification Search ............ 40/544, 40/577, 800, 546, 442; 362/806, 812, 565; 264/400
See application file for complete search history.

(56) References Cited

U.S. PATENT DOCUMENTS

| | | | |
|---|---|---|---|
| 5,027,528 A | * | 7/1991 | Andersson .................. 34/255 |
| 5,124,890 A | * | 6/1992 | Choi et al. .................. 362/27 |
| 5,138,783 A | * | 8/1992 | Forsse .......................... 40/546 |
| 5,178,447 A | | 1/1993 | Murase et al. |
| 5,564,810 A | | 10/1996 | Larson |
| 5,730,518 A | | 3/1998 | Kashima et al. |
| 6,308,444 B1 | * | 10/2001 | Ki ................................ 40/546 |
| 6,537,479 B1 | * | 3/2003 | Colea .......................... 264/400 |
| 2004/0141325 A1 | * | 7/2004 | Davenport .................. 362/351 |

* cited by examiner

*Primary Examiner*—Cassandra Davis
(74) *Attorney, Agent, or Firm*—Harpman & Harpman

(57) ABSTRACT

A visual display consisting of multiple transparent sheets of material in which a color separated image component is reproduced inside each of the optically transparent sheets and are illuminated by a selective discernible light source about the receiving edges of the respective sheets. The sheets are positioned in spaced overlying relationship to one another with aligned image components viewable therefore as a single composite image. The discernible light source can be selectively sequenced to produce light in the range of the respective primary visual colors beyond that of the primary colors from which it is derived on independent sheets.

13 Claims, 4 Drawing Sheets

COMPOSITE PANEL DISPLAY BY REFRACTED LIGHT

BACKGROUND OF THE INVENTION

1. Technical Field

This invention relates to edge light panel displays that provide a lighted surface based on the characteristics of light reflection and refraction.

2. Description of Prior Art

Prior art devices of this type have been directed to visual illuminated displays utilizing board or panels on which images are presented. A variety of different illumination systems have been developed; see for example U.S. Pat. Nos. 5,124,890, 5,178,447, 5,564,810 and 5,730,518.

In U.S. Pat. No. 5,124,890 a display board is disclosed in which multiple transparent acrylic plates having edge illumination are provided with grooves within their respective surfaces. The grooves are illuminated by the transferred light within the panel.

U.S. Pat. No. 5,178,447 discloses an edge light panel in which a liquid crystal display has an emitter panel.

U.S. Pat. No. 5,564,810 is directed towards a full color stereoscopic display with color multiplexing in which polarization of color is used in different display of color images provides the basis for discriminating different perspective three-dimensional images.

U.S. Pat. No. 5,130,518 claims a back lighting device wherein display panels of light conducting material are provided with linear light sources along one edge. The display panels are made of a light transmissive material in which the surface of the respective panels have multiples of pyramidal or conical projections at minute intervals on the same size.

SUMMARY OF THE INVENTION

An electrical illuminated display utilizing multiple transparent sheets of material in which image components have been internally reproduced by a high-energy laser beam process. The panels are arranged in overlapping spaced aligned relationship to one another, each of which has a plurality of independently controlled lamp assemblies about the perimeter edges. Selective illumination sequences utilizing the primary colors combined with image component density will impart multiple color images when viewed as a unified multi-sheet image in which portions of the image colors are empowered by selective panels during the illumination process.

DESCRIPTION OF PREFERRED EMBODIMENT

Figure 1:
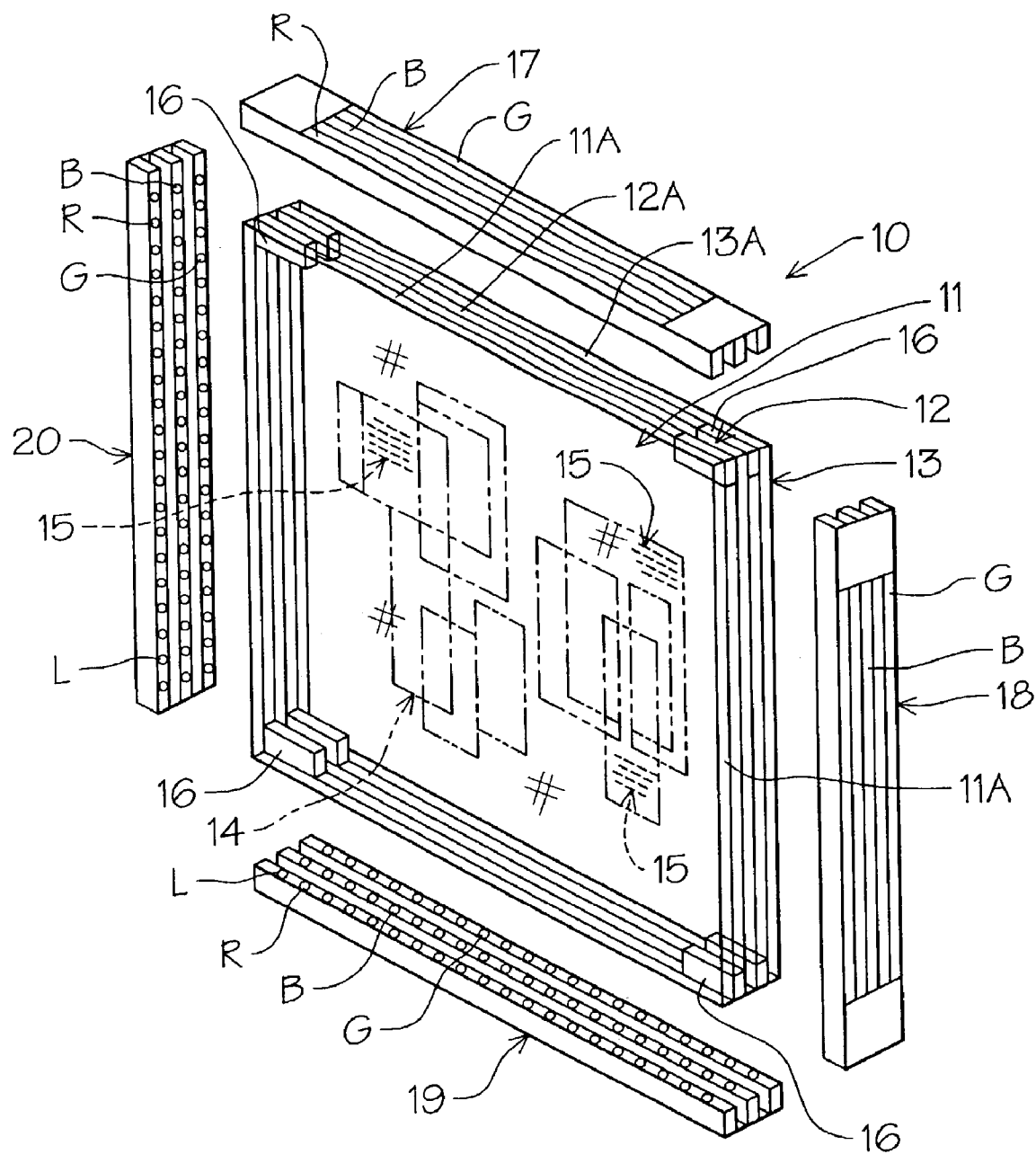
FIG. 1 is an exploded perspective view of the display panel of the invention.
Figure 2:
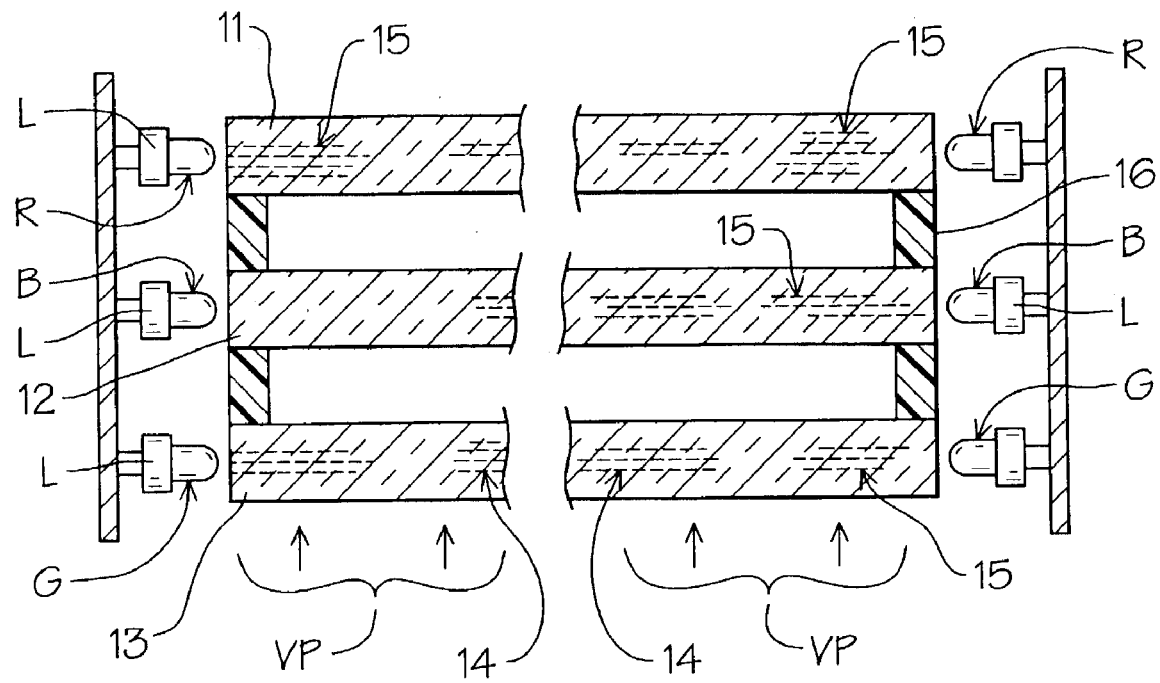
FIG. 2 is a partial sectional view of the display panel with portions in graphic representation.

Referring to FIGS. 1 and 2 of the drawings a composite display 10 can be seen having a plurality of optically transparent sheets 11, 12 and 13. Each of the sheets 11–13 has a graphic image components 14 indicated as broken lines reproduced within the interior of the respective sheets. The graphic images 14 are formed by a computer graphic internal etching system set forth and included herein by reference by U.S. Pat. No. 6,078,617 that uses a computer controlled high intensity laser to form a number of etch points 15 within the material. Each of the etch points 15 represented generally by dotted lines, in FIG. 2 of the drawings define a fracture within the material in a precise and controlled manner dependent on the nature of the material which in this example chosen for illustration is glass re-creating the selected image suspended within the material.

Each of the so-configured transparent sheets 11–13 are correspondingly secured together in overlying spaced parallel relation with one another utilizing multiple spacers 16 there between at points inwardly from their corresponding perimeter edges 11A, 12A and 13A. Portions of the respective images 14 on the independent sheets 11–13 are arranged for visually alignment with one another so that when viewed on a horizontal plane from a central viewpoint VP in front of the first sheet 11 as graphically illustrated in FIG. 2 of the drawings, a composite image representation can be seen.

The number of etch points 15 is defined as its density, thus the effective visualization is dependent on the relative density of etch points 15 within each sheet as will be described in greater detail hereinafter.

Figure 3:
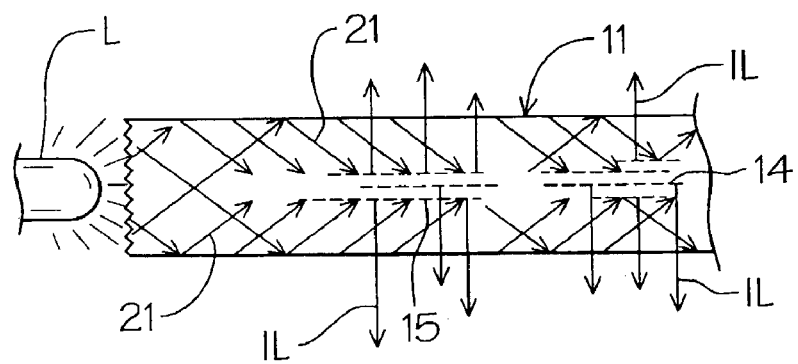
FIG. 3 is an enlarged partial horizontal sectional view of a sheet of the panel display with the associated lamp source.

The sheets 11–13 have respective multiple illumination assemblies 17, 18, 19 and 20 secured against their respective perimeter edges 11A, 12A and 13A. Each of the illumination assemblies 17–20 are made up of a plurality of longitudinally spaced individual lamps L. The lamps L are electrically connected to a control circuit 20 and can be activated in a variety of inter-independent sequences directed to illumination assemblies on specific display sheets as seen in FIG. 5 of the drawings. The lamps L produce visually distinguishable wavelengths of light that correspond to primary colors; red, blue and green in this example and are indicated graphically in FIGS. 4 and 5 of the drawings as red (R), blue (B), and green (G) for each of the respective sheets 11–13. As noted, the light assemblies 17–20 are positioned along their respective perimeter edges 11A, 12A and 13A for end edge illumination as illustrated in FIG. 2 of the drawings. Due to the refractive properties of the sheet material used, light rays 21 so generated will enter the sheets 11–13 and travel there through within as illustrated graphically in FIG. 3 of the drawings in accordance with normal light transfer properties in a transparent sheet of planar oriented material. It will be seen that when the light rays 21 encounter the respective etch points 15 which are, as noted, individually controlled fractures within the sheet material itself, the light path so generated will be disrupted and thus illuminated at IL in the discernible color of the lamps used.

Figure 4:
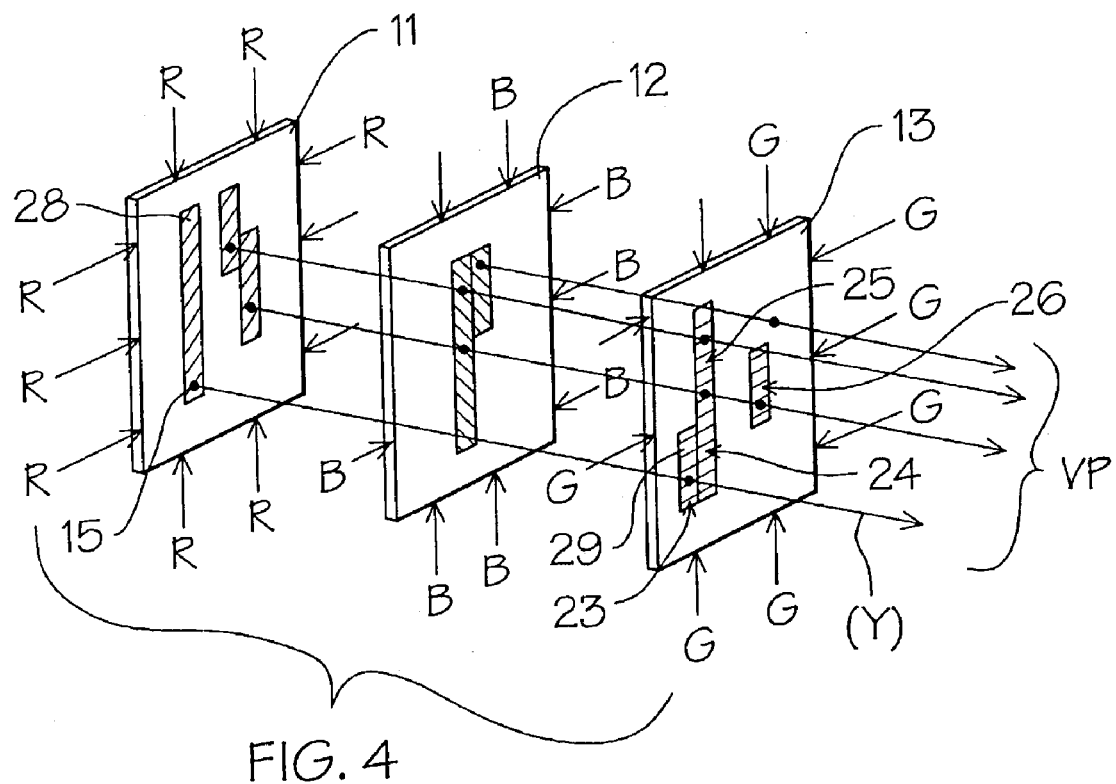
FIG. 4 is a graphic representation of multi-composite illuminated images within the respective sheets.
Figure 5:
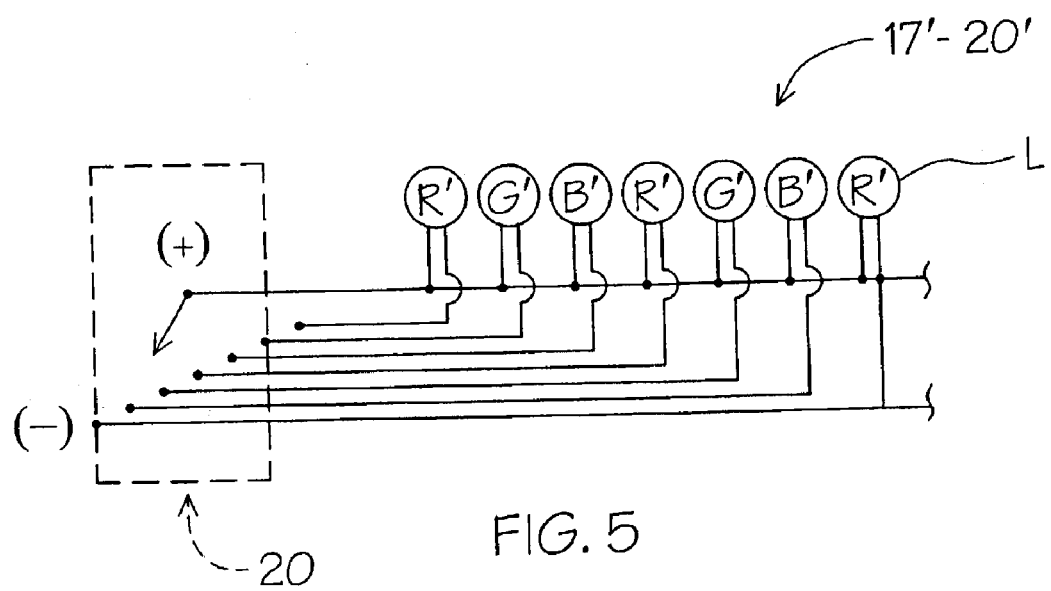
FIG. 5 illustrates a lamp portion of the represented lighting control circuit.

Referring now to FIG. 4 of the drawings, a graphic representative illustration of one operational sequence is shown in which the activation of the primary red lamps (R) illuminate all of the etch points 15 within the sheet 11 in red light. Correspondingly, the sheet 12 is illuminated by blue lamps B and the sheet 13 by green lamps G. Given the overlapping aligned orientation of the respective sheets as hereinbefore described, portions of the respective illuminated etch points 15 images will be viewable together to define an attenuated color representation as illustrated by the respective view line arrows and the component color images representations 23–27 as viewed from the viewpoint VP.

The composite color separation of images 23–27 will be dependent on the combination of overlying colors illustrated by the hereinbefore-described lamps L of their respective light assemblies 17–19 their illumination sequence and etch point density.

The effective density of the etch points 15 within each sheet will determine the viewable color. For example, referring to FIG. 4 of the drawings wherein an image component at 28 on sheet 11 has a proportional density of 50% illuminated by red (R) lamps, and sheet 13 image component at 29 has etch point density of 50% illustrated by green (G) lamps. The resulting viewable color is therefore defined as yellow (Y) in relation to the viewpoint VP of the sheet 13. It will therefore be evident that by varying the effective density of the etch points within each sheet that the composite visualization will provide a diverse color spectrum from the viewpoint VP.

Figure 6:
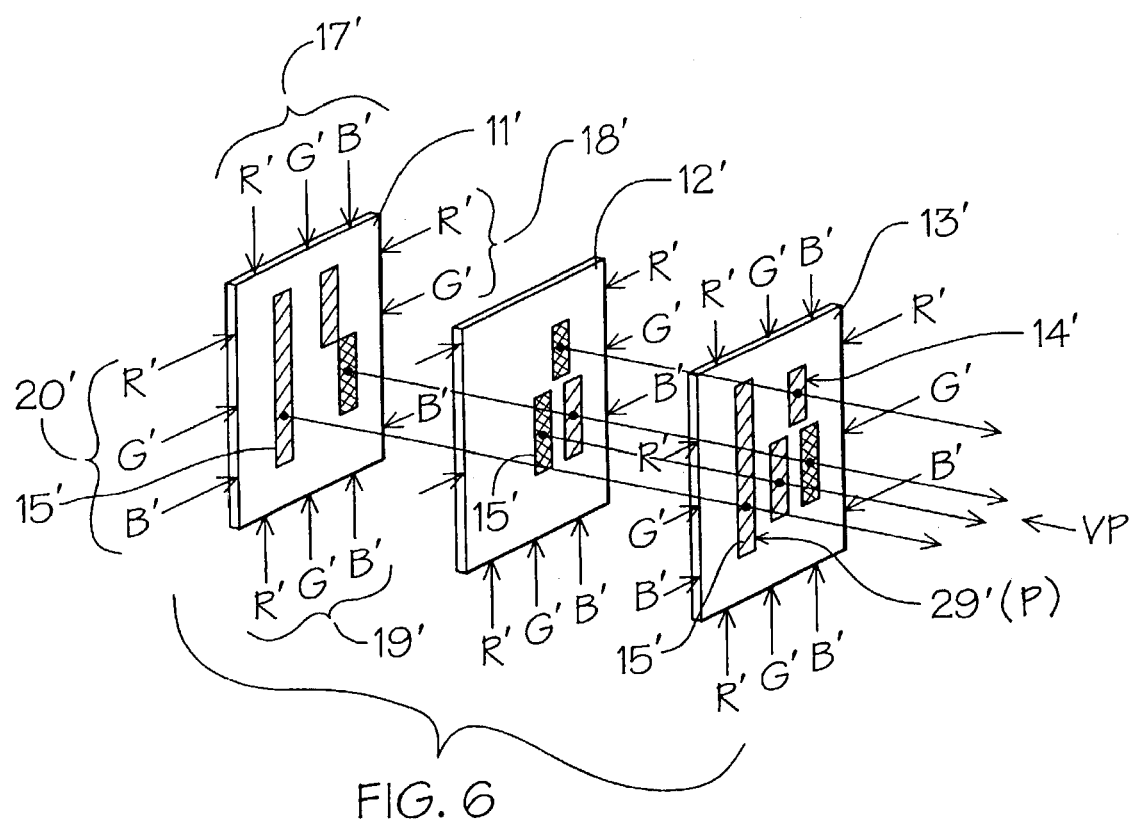
FIG. 6 is a graphic representation illustrating an alternate switchable lamp configuration of the invention.

An alternate illumination sequence can be seen in FIG. 6 of the drawings wherein each illumination assemblies 17'–20' would have three primary color lamps within each, longitudinally arranged corresponding to each individual sheet as noted by multiple lamp colors R', G' and B'. This will provide a switchable color shift to the selective composite image 14' to be created.

An example can be illustrated in which the image at 29' could be changed to a purple (P) visualization by switching sheet 13 to blue (B'). It will be evident from the above description that by combining relative etch points 15' density and switchable lamp color illumination that the full spectrum of available colors can be achieved as well as selectivity of defined colored lamps of the respective illumination displays and their associated sheets.

It will also be apparent that more than three image enabled sheets can be used, for example, in modular sheet sets in which two sets of three sheets each can be combined for a total of six sheets (not shown) to provide a single display panel having enhanced image selection, rendition and color viability can be achieved.

The lamps L are preferably of a light emitting diode type (LED) and the control circuit 20 would be that of a commercially available solid state electrical sequence switching device for LED lamps as are well known and understood within the art. Such switching devices are used to control the sequence, interval and duration and illumination for the respective light assemblies 17, 17', 18, 18' and 19, 19'. The lamps L can alternately be of a non-color visualization with the discernable color attributed by so defined lens of color visualization (not shown) as will be well understood by those skilled in the art.

It will be noted that due to the nature of the computer graphic laser etching system set forth in U.S. Pat. No. 6,078,617, the laser etching can be very detailed allowing for a wide variety of images to be reproduced in both two and three dimensional visualization within the display material.

It will thus be seen that a new and useful composite display panel has been illustrated and described and that various changes and modifications may be made therein without departing from the spirit of the invention.

Therefore I claim:

1. A compact illumination display assembly comprises,
    multiple optically transparent rigid sheets each having a plurality of etch points within each sheet, the etch points within each sheet defining a portion of a composite image,
    said sheets arranged in spaced parallel relation to one another,
    means for spacing said sheets in overlying aligned registration,
    a plurality of lamps around at least one respective edges of each of said sheets,
    said lamps are optically aligned for edge illumination of said respective sheets, and their respective etch points therewithin said composite image visualization formed by overlapping aligned etch points on said sheets corresponding to said portion of an image
    a control means for selective activation of said lamps,
    said lamps being of distinguishable wavelengths in representative colors with respect to one another on corresponding sheets.

2. The display assembly set forth in claim 1 wherein said etch points are formed below respective planar surfaces of each of said sheets by controlled micro fractures totally within the body of said rigid sheets.

3. The display set forth in claim 2 wherein said etch points are formed by a laser.

4. The display set forth in claim 2 wherein said etch points are of differing density to achieve variations of said composite image when in said multiple sheet aligned images.

5. The display set forth in claim 1 wherein said means for spacing said sheets in overlying aligned registration comprises,
    spacers between said sheets.

6. The display set forth in claim 1 wherein said optically aligned lamps position around said respective edges of said sheets to project light waves through said sheets in corresponding planar relation.

7. The display set forth in claim 1 wherein said lamps are in light assemblies,
    said light assemblies electrically interconnected to one another around the edges of each of said sheets and to a source of power.

8. The display set forth in claim 1 wherein said control means for selective activation of said lamps comprises a programmable sequential electronic switch.

9. The display set forth in claim 1 wherein said distinguishable wavelength in respective colors of said lamps are of the primary colors; red, blue and green.

10. The display set forth in claim 1 wherein said portions of said images within each of said sheets are aligned for composite visual relation when viewed as a single display surface from a viewing point during selective wavelength color illumination.

11. The display set forth in claim 1 wherein said lamp of distinguishable wavelengths in representative colors are in longitudinally aligned spaced relation to one another for edge Illumination of each sheet.

12. The display set forth in claim 11 when said aligned lamps of distinguishable wavelengths are selectively illuminated in like wavelength groups definable from said primary colors.

13. The display set forth in claim 1 wherein said lamps of distinguishable wavelengths are comprised of lamps and intermediate discernible color visualization elements.

* * * * *